United States Patent [19]

Kinoshita et al.

[11] Patent Number: 4,771,873
[45] Date of Patent: Sep. 20, 1988

[54] ONE-WAY CLUTCH WITH CAGE-DISPLACEMENT LIMITING MECHANISM

[75] Inventors: Yoshio Kinoshita; Mikio Uchida, both of Kanagawa, Japan

[73] Assignee: NSK-Warner K.K., Japan

[21] Appl. No.: 942,632

[22] Filed: Dec. 17, 1986

[30] Foreign Application Priority Data

Dec. 26, 1985 [JP] Japan ............................ 60-199245[U]

[51] Int. Cl.[4] .............................................. F16D 41/07
[52] U.S. Cl. ................................. 192/41 A; 192/45.1; 384/129
[58] Field of Search ................ 192/41 A, 45.1, 109 R; 188/82.8; 384/129

[56] References Cited

U.S. PATENT DOCUMENTS

| 2,683,509 | 7/1954 | Jandasek | 192/45.1 |
|---|---|---|---|
| 2,886,153 | 5/1959 | Cobb | 192/45.1 |
| 2,912,086 | 11/1959 | Troendly et al. | 192/45.1 |
| 2,916,124 | 12/1959 | Troendly et al. | 192/45.1 |
| 2,917,145 | 12/1959 | Ferris et al. | 192/45.1 |
| 3,049,205 | 8/1962 | Ferris et al. | 192/45.1 |
| 4,619,352 | 10/1986 | Shoji et al. | 192/41 A |

Primary Examiner—Leslie A. Braun
Assistant Examiner—Richard M. Lorence
Attorney, Agent, or Firm—Wegner & Bretschneider

[57] ABSTRACT

A one-way clutch with a cage-displacement limiting mechanism is constructed of an outer race; an inner race concentric with the outer race; sprags arranged within a space between the outer and inner races and being displaceable between first positions, where the sprags are maintained in contact with the inner and outer races to transmit a torque, and second positions where the sprags cannot transmit any torque; first and second annular cages arranged within the space with a radial interval therebetween, holding the sprags in place, and being rotatable relative to each other between first relative positions, where the sprags are caused to move to the first positions, and second relative positions where the sprags are caused to move to the second positions; and a limiting member for connecting the cages to each other and for limiting the degrees of relative movements of the cages.

8 Claims, 3 Drawing Sheets

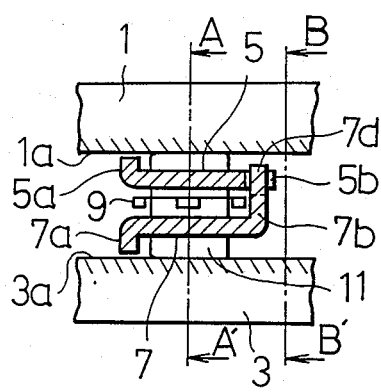
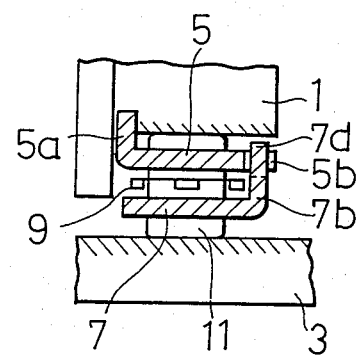
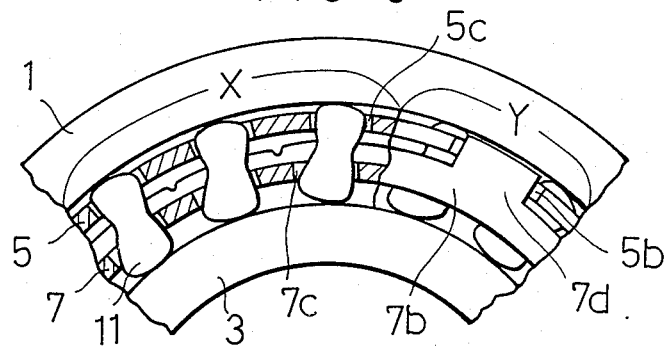
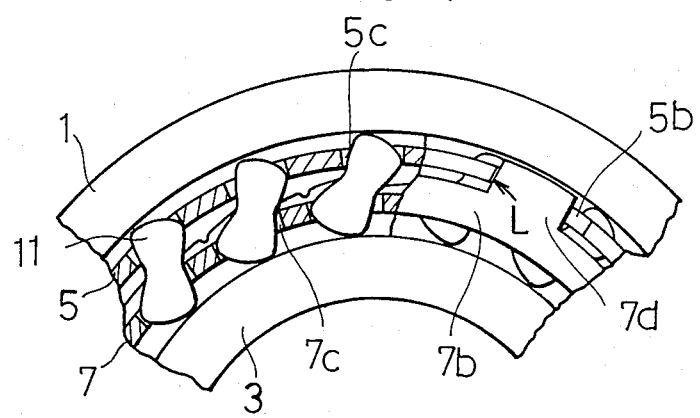

ONE-WAY CLUTCH WITH CAGE-DISPLACEMENT LIMITING MECHANISM

BACKGROUND OF THE INVENTION (1.) Field of the Invention

This invention relates to a one-way clutch and more specifically to a one-way clutch with a cage-displacement limiting mechanism.

(2.) Description of the Prior Art

Typical conventional one-way clutches (hereinafter called "OWC") are sprag-type OWCs equipped with double cages, namely, both inner and outer cages. In a sprag-type OWC, the inner and outer cages serve to arrange plural sprags with equal angular intervals and to have all the sprags move in unison. The structures and functions of conventional sprag-type OWCs will hereinafter be described in brief with reference to FIGS. 9 and 10.

FIG. 9 is a fragmentary cross-sectional view of a sprag-type OWC having double cages. A flange 5a of an outer cage 5 is guided by an inner peripheral surface 1a of an outer race 1, while a flange 7a of an inner cage 7 is guided by an outer peripheral surface 3a of the inner race 3. All sprags 11 can be brought into simultaneous engagement with the outer cage 5 and inner cage 7 to bear each torque evenly, because the sprags 11 are allowed to move relative to movements of the outer and inner races 1,3. In the illustrated example, a ribbon spring 9 is interposed between the outer and inner cages 5,7 so that the sprags 11 are normally maintained in contact with the inner and outer peripheral surfaces 1a,3a. In FIG. 10, the flange 5a of the outer cage 5 is positioned at a stepped portion of the outer race 1, where the flange 5a is supported by a support member 13. Further, the flange 7a of the inner cage 7 extends toward the inner peripheral surface 1a of the outer race 1.

In the above-described conventional sprag-type OWCs each of which is equipped with the double cages, the so-called full phasing effect is known to take place when the sprags are moved from their free positions to their torque-transmitting locked positions. It is hence possible to achieve smooth transmission of torques even somewhat severe use conditions.

The above-described prior art is however accompanied by various problems. When such a conventional OWC is subjected to an excess torque, its sprags are caused to rise from their normal free positions and then to fall in the opposite direction beyond the cam height, in other words, to undergo the so-called rollover. As secondary outcomes, the cages are deformed or broken and the ribbon spring are caused to undergo fatigue due to its deformation. In addition, deep impressions are formed in both inner and outer races, thereby making them no longer usable. In some severe instances, the sprags cut into the outer and inner peripheral surfaces of the inner and outer races and are no longer allowed to idle.

If the sprags undergo slipping and are hence unloaded while they are maintained in engagement with the outer and inner peripheral surfaces of the inner and outer races, the sprags are immediately caused to fall toward the free side as a counteraction to the release of the load, in other words, the so-called popping phenomenon develops. The sprags thus start stepping and hopping in a very short period of time. As a result, the sprags collide severely against the inter-pocket parts of the cages and the cages are hence worn and deformed. In some worst cases, the sprags may move beyond their associated inter-pocket parts and enter forcibly between both cages. This phenomenon is called "pop-out". When the sprags undergo popping, skid marks are formed on the inner cam surfaces of the sprags and the inner cam surfaces are therefore worn out, leading to wearing and breakage of the interpocket parts of the cages, deformation and breakage of the ribbon spring, etc. Even if only one of the sprags pops out, the inner cage is turned toward the idling side by the pop-out and the other sprags are hence tilted toward the free side and are thus separated from the outer peripheral surface of the inner race. As a consequence, the OWC loses its function as an OWC and can no longer transmit torques.

As typified by the above-described two examples, it is the falling of sprags that causes serious problems in sprag-type OWCs. An OWC cannot function properly when its sprags fall excessively not only toward the free side but also toward locked side.

In order to solve the above-described problems, it is indispensable to perform very strictly the control of the designing of the outer configurations of the sprags including their strut angles and the control of the dimensional accuracy of the pockets of the inner cage. It may also be contemplated to increase the thickness of the inner cage and/or the torque capacity of the OWC so as to increase the safety factor. It may also be necessary to improve the material of the ribbon spring so as to make it more flexible.

If one tries to solve the above problems in the aforementioned manner, secondary problems arise such that the device becomes more complex in that its manufacturing cost increases substantially due to the need for strict designing and control of the dimensions of various parts, and the assembly work becomes difficult. Therefore, the above-mentioned solution cannot be fully considered as a breakthrough and practical solution.

SUMMARY OF THE INVENTION

An object of this invention is to solve the above-mentioned problems of the prior art and hence to provide a one-way clutch which can readily materialize a structure capable of preventing the falling of sprags and ensuring stable and smooth transmission of torques without need for increased machining accuracy of various parts is economical and gives good design margin or flexibility.

In one aspect of this invention, there is thus provided a one-way clutch with a cage-displacement limiting mechanism, which comprises:

an outer race having an inner peripheral surface;

an inner race having an outer peripheral surface and arranged concentrically with the outer race;

sprags arranged within an annular space formed between the outer and inner races and being displaceable between first positions, where the sprags are maintained in contact with the inner and outer peripheral surfaces to transmit a torque, and second positions where the sprags are unable to transmit any torque;

first and second annular cages arranged within the space with a radial interval therebetween, holding the sprags in place, and being rotatable relative to each other between first relative positions, where the sprags are caused to move to the first positions, and second relative positions where the sprags are caused to move to the second positions;

a limiting means for connecting the cages to each other and limiting the degrees of relative movements of the cages; and a means for urging the sprags to the first positions.

The one-way clutch of this invention has inter alia the following advantages.

(1) Conventional OWCs required very high machining accuracy as to the designing of pockets and other parts. The present invention can ease this requirement. Namely, this invention gives better design flexibility and facilitates the manufacturing.

(2) Although the relative displacement between an inner cage and its corresponding outer cage has been limited by parts of pockets of the inner cage, it can be firmly limited by the entire pockets so that it is stabilized.

(3) Owing to the stabilized relative displacement, the wear of the pockets is reduced and the flexibility of the ribbon spring can be set at a lower degree. It is hence expected to show better performance under severe conditions such as vibrations.

(4) As an outcome of the above advantages (1), (2) and (3), a high degree of freedom is provided regarding the machining accuracy of various parts and the selection of materials (especially, materials for the sprags and ribbon spring) so that the manufacturing cost can be lowered.

BRIEF DESCRIPTION OF THE DRAWINGS

The above and other objects, features and advantages of this invention will become apparent from the following description and the appended claimed, taken in conjunction with the accompanying drawings, in which:

FIG. 1 is a fragmentary cross-sectional view of an OWC according to the first embodiment of this invention;

FIG. 2 is a fragmentary cross-sectional view of a modification of the first embodiment;

FIG. 3 is a fragmentary plan view of the OWC of FIG. 1 and shows sprags in their normal free positions;

FIG. 4 is similar to FIG. 3 but shows the sprags in their free positions;

In all the above figures, like elements of structure are identified by like reference numerals.

The first embodiment will be described first of all. Referring to FIG. 1, the OWC is constructed of the plural sprags 11 in the form of a peanut shell, the outer cage 5 and inner cage 7 of an annular shape, and the ribbon spring 9. The sprags 11 are arranged side by side at equal angular intervals between the ring-shaped outer race 1, which has the inner peripheral surface 1a, and the ring-shaped inner race 3 which has the outer peripheral surface 3a opposing concentrically to the inner peripheral surface 1a. The sprags 11 serve to transmit torques. The outer and inner cages 5,7 hold the sprags 11 therebetween. The ribbon spring 9 assembled between the outer and inner cages 5,7 serves to always maintain the sprags 11 in contact with the inner and outer peripheral surfaces 1a,3a.

Figure 5:
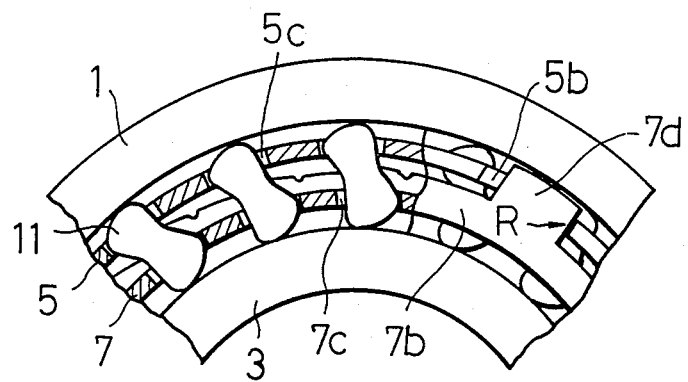
FIG. 5 is similar to to FIG. 4 but shows the sprags in their locked positions.

The outer and inner cages 5,7 respectively have annular flanges 5a,7a which extend out radially, in opposite directions to each other, and substantially at right angles from one side surfaces thereof. Free peripheral edge portions of the flanges 5a,7a are guided respectively by the inner and outer peripheral surfaces 1a,3a. A rectangular shallow notch 5b (see, FIG. 3) is formed in the other side surface of the outer cage 5. This notch 5b is provided at one location. If necessary, plural notches may be provided with equal angular intervals. On the other hand, an annular flange 7b is provided on the other side surface of the inner cage 7. The annular flange 7b extends radially, substantially at a right angle, toward the outer race 1. A part of the flange 7b also has an extension 7d (see, FIG. 3) extending toward the inner peripheral surface 1a of the outer race 1 and having a rectangular shape in a plan. The number of extensions 7d corresponds to the number of notches 5b. Further, the free peripheral end surface of the extension 7d has the same radius curvature as the inner peripheral surface 1a of the outer race 1 and is guided by the inner peripheral surface 1a.

As illustrated in FIG. 1, the extension 7d enters the notch 5b to form an engaged part. The axial depth (height) of the notch 5b is somewhat greater than the thickness of the inner cage 7, namely, the extension 7d. They are therefore maintained in mutual engagement with a sufficient clearance in the axial direction. Accordingly, they are not readily disengaged even when vibrations are applied to the OWC.

Referring now to FIG. 3, X indicates a cross-section seen in the direction indicated by arrows A,A' in FIG. 1. The sprags 11 are arranged with equal angular intervals. Both end portions of the sprags 11 are held in pockets 5c of the outer cage 5 and in pockets 7c of the inner cage 7 respectively. On the other hand, Y is a cross-section seen in the direction indicated by arrows B,B' in FIG. 1 and shows the manner of engagement between the notch 5b and extension 7d. As is understood from Y of FIG. 3, the peripheral length of a notch 5b of the outer cage 5 is greater than the peripheral length of an extension 7d of the inner cage 7. Accordingly, a suitable degree of clearance is formed at the engaged parts of the outer and inner cage 5,7. Owing to the provision of the clearance, the outer and inner cages 5,7 are allowed to move relative to each other within a range not deleteriously affecting the performance of the OWC. This clearance is set at such a degree that the vibrations of the sprag 11 are not limited beyond necessity.

The operation of the OWC according to the first embodiment of this invention, which OWC is equipped with the cage-displacement limiting mechanism, will next be described. FIG. 3 shows the sprags 11 just assembled between the inner and outer races 3,1. The sprags 11 are in contact with the races 3,1 by the urging force of the ribbon spring 9 and are at their normal free positions where they are allowed to move freely toward either free or locked side, which will be described subsequently, depending on the direction of relative rotation between the inner and outer races 3,1. In this case, there are clearances at both ends of the extension 7d at the engaged parts of the notch 5b and extension 7b as mentioned above. Both cages are therefore allowed to move relative to each other. When the sprags 11 fall toward the free side from the above-described positions, the relative movement between both of the cages is limited directly at a position L as indicated in FIG. 4. Therefore, the sprags 11 are prevented from falling too much toward the free side. When the sprags 11 fall toward the locked side, the relative movement between both cages is controlled directly at the position R as shown in FIG. 5. The sprags 11 are therefore prevented from falling toward the locked side.

In the first embodiment, the notch 5b is formed in the outer cage 5 and the extension 7d is provided with the inner cage 7. This construction may be reversed. In addition, as illustrated in FIG. 2, the present invention may also be applied to an OWC of such a construction that the flange 5a of the outer cage 5 is supported at the part opposite to the engaged part by the stepped portion of the outer race 1 and no flange is provided with the inner cage 7. Further, needless to say, the engaged part may be provided at either one of the axial end portions of the outer cage 5.

The second embodiment of this invention will next be described. Although the inner and outer cages 7,5 are in mutual engagement in the aforementioned first embodiment, intermediate members are used in the second embodiment.

Figure 6:
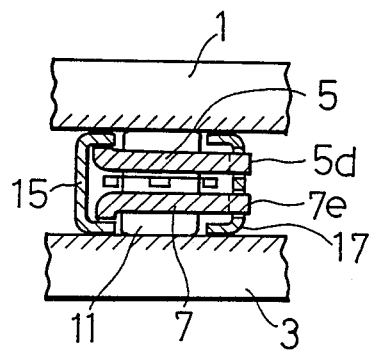
FIG. 6 is a fragmentary cross-sectional view of an OWC according to the second embodiment of this invention.

In FIG. 6, shell-type end bearings 15,17 are used as intermediate members in order to limit the relative displacements of the outer and inner cages 5,7. In this embodiment, the outer and inner cages 5,7 respectively have at least one axially-extending rectangular extensions 5d,7e on their peripheral end surfaces which are located on the sides opposite to the flanges. The end bearing 17 defines, at locations corresponding to the extensions 5d,7e, peripherally-extending slots 17a,17b in which the extensions 5d,7e are received respectively (see, FIG. 8). The number of such slots must correspond to that of extensions. Since the axial lengths of the extensions 5d,7e are greater than the depths of the slots 17a,17b of the end bearing 17, the extensions 5d,7e and slots 17a,17b will not be disengaged by vibrations or the like.

Figure 8:
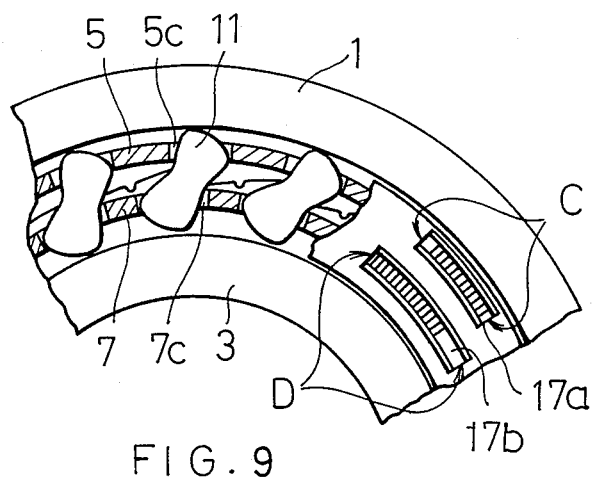
FIG. 8 is a fragmentary plan view of the OWC of FIG. 6.
Figure 9:
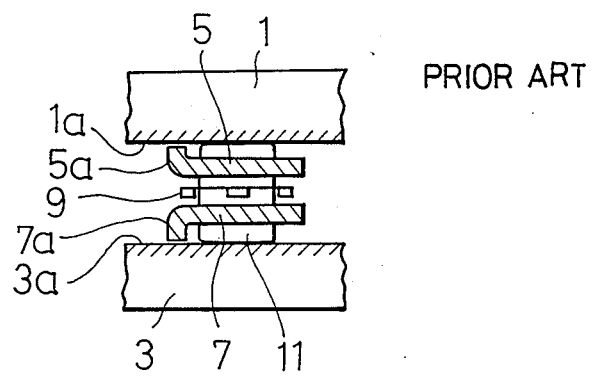
FIGS. 9 and 10 are fragmentary cross-sectional views of the conventional OWCs.
Figure 10:
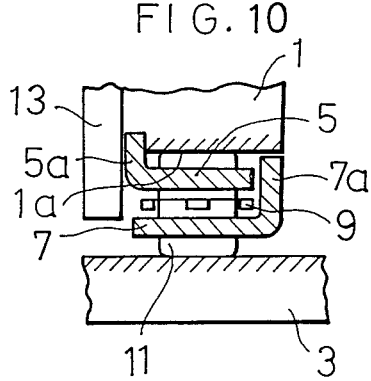

Here, reference is made to FIG. 8 which is a fragmentary plan view corresponding to FIG. 6. FIG. 8 shows the manner of reception of the extensions 5d,7e in their corresponding slots 17a,17b of the end bearing 17. As readily envisaged from the figure, the extensions 5d,7e have the same radius of curvature as the slots 17a,17b. Each of the engaged parts has a greater clearance in the peripheral direction than in the radial direction. The clearance in the peripheral direction should be determined properly so as to avoid such a situation that the relative displacements of the cages 5,7 are limited too much to permit the smooth tilting of the sprags 11.

Figure 7:
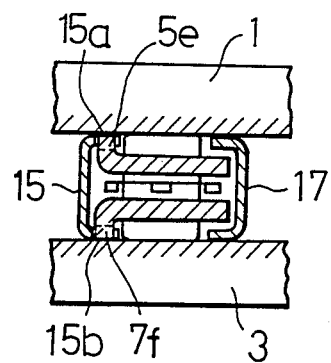
FIG. 7 a fragmentary cross-sectional view of a modification of the OWC of FIG. 6.

The operation of the OWC of the second embodiment is similar to that of the first embodiment. The relative displacements of both cages 5,7 are limited as a result that both sides of the extensions 5d,7e are respectively brought into abutment against both end edges C,D of the slots 17a,17b. Since their displacements are limited like the first embodiment whenever the sprags 11 fall toward the free side or locked side, the sprags 11 are prevented from falling unduly. In this embodiment, there is another advantage that the end bearing 17 is prevented from rotating along with the outer race 1 or inner race 3. FIG. 7 shows a modification of the second embodiment. Rectangular extensions 5e,7f are provided with parts of the flanges 5a,7a of the outer and inner cages 5,7. The extensions 5e,7f are maintained in engagement with their corresponding slots which extend in the peripheral direction and are formed through the annular flanges 15a,15b maintained in contact with the inner and outer peripheral surfaces 1a,3a.

The embodiments of this invention have been described in detail. The above-described embodiments and their modifications shall however not be construed in a manner limiting the present invention. Needless to say, other modifications are feasible. For example, the shapes of the notches, extensions and slots are substantially rectangular at the engaged part between the outer and inner cages and the engaged parts between the outer and inner cages and auxiliary members in the above-described embodiments. Their shapes are not necessarily required to be rectangular.

Having now fully described the invention, it will be apparent to one of ordinary skill in the art that many changes and modifications can be made thereto without departing from the spirit or scope of the invention as set forth herein.

We claim:

1. A one-way clutch with a cage-displacement limiting mechanism, comprising:
    an outer race having an inner peripheral surface;
    an inner race having an outer peripheral surface and arranged concentrically with the outer race;
    sprags arranged within an annular space formed between the outer and inner races and being displaceable between first positions, where the sprags are maintained in contact with the inner and outer peripheral surfaces to transmit a torque, and second positions where the sprags are unable to transmit any torque;
    first and second annular cages arranged within the space with a radial interval therebetween, holding the sprags in place, and being rotatable relative to each other between first relative positions, where the sprags are caused to move to the first positions, and second relative positions where the sprags are caused to move to the second positions;
    a limiting means for connecting the cages to each other and for limiting the degrees of circumferential movements of the cages relative to each other; and
    a means for urging the sprags to the first positions,
    wherein each of the first and second cages has two side surfaces, the limiting means comprises a first engagement part formed on one of the side surfaces of the first cage and a second engagement part formed on one of the side surfaces of the second cage, and the second engagement part is engageable with the first engagement part.

2. The one-way clutch as claimed in claim 1, wherein the second cage has, on said one side surface, a flange extending toward the first cage and the second engagement part is formed on the flange.

3. The one-way clutch as claimed in claim 1, wherein one of the first and second engagement parts is a notch and the other is an extension extending into the notch.

4. The one-way clutch as claimed in claim 1, wherein the first and second cages have, on the other side surfaces thereof, annular flanges extending away from the second and first cages respectively, a free edge of one of the flanges is guided by the inner peripheral surface of the outer race, and the free edge of the other flange is guided by the outer peripheral surface of the inner race.

5. The one-way clutch as claimed in claim 1, wherein a stepped portion is formed in the inner or outer race, a flange is formed on the other side surface of the first cage extending in a direction away from the second cage, and a free edge portion of the flange is received in the stepped portion.

6. A one-way clutch with a cage-displacement limiting mechanism, comprising:
   an outer race having an inner peripheral surface;
   an inner race having a outer peripheral surface and arranged concentrically with the outer race;
   sprags arranged within an annular space formed between the outer and inner races and being displaceable between first positions, where the sprags are maintained in contact with the inner and outer peripheral surfaces to transmit a torque, and second positions where the sprags are unable to transmit any torque;
   first and second annular cages arranged within the space with a radial interval therebetween, holding the sprags in place, and being rotatable relative to each other between first relative positions, where the sprags are caused to move to the first positions, and second relative positions where the sprags are caused to move to the second positions;
   a means for urging the sprags to the first positions;
   an end bearing provided between the inner and outer races; and
   a limiting means provided between the end bearing and the cages for limiting the degrees of circumferential movements of the cages relative to each other,
   wherein the limiting means comprises first engagement parts formed respectively on one side surface of the first and second cages and second engagement parts formed on the end bearing and engageable respectively with the first engagement parts, and
   wherein the end bearing has a first flange maintained in contact with the inner peripheral surface of the outer race, a second flange maintained in contact with the outer peripheral surface of the inner race and a part connecting the first and second flanges to each other, the second engagement part is a slot formed through the connecting part, and the first engagement part is an extension received in the slot.

7. The one-way clutch as claimed in claim 6, wherein the length of the extension is greater than the thickness of the end bearing.

8. The one-way clutch as claimed in claim 6, wherein the extension has substantially a rectangular cross-section, and the clearance between the extension and the edge of the slot is wider in the circumferential direction than in the radial direction.

* * * * *